ELECTRICAL MODULE AND SYSTEM

Filed Jan. 25, 1968 5 Sheets-Sheet 1

INVENTORS
EDGAR O. SPRUDE
WALTER H. MARSHALL
BY
Samuel Kane
ATTORNEY

INVENTORS.
EDGAR O. SPRUDE
WALTER H. MARSHALL
BY
Samuel Kane
ATTORNEY

Sept. 16, 1969 E. O. SPRUDE ET AL 3,467,892

ELECTRICAL MODULE AND SYSTEM

Filed Jan. 25, 1968 5 Sheets-Sheet 3

INVENTORS.
EDGAR O. SPRUDE
WALTER H. MARSHALL

BY Samuel Kane
ATTORNEY

ELECTRICAL MODULE AND SYSTEM

INVENTORS.
EDGAR O. SPRUDE
WALTER H. MARSHALL
BY Samuel Kane
ATTORNEY

Sept. 16, 1969 E. O. SPRUDE ET AL 3,467,892

ELECTRICAL MODULE AND SYSTEM

Filed Jan. 25, 1968 5 Sheets-Sheet 5

INVENTORS.
EDGAR O. SPRUDE
WALTER H. MARSHALL

BY Samuel Kane
ATTORNEY

United States Patent Office 3,467,892
Patented Sept. 16, 1969

3,467,892

ELECTRICAL MODULE AND SYSTEM

Edgar O. Sprude, Philadelphia, and Walter H. Marshall, Media, Pa., assignors to Burroughs Corporation, Detroit, Mich., a corporation of Michigan Filed Jan. 25, 1968, Ser. No. 700,443
Int. Cl. H02b *1/08*
U.S. Cl. 317—117 10 Claims

ABSTRACT OF THE DISCLOSURE

The electrical module includes a frame, a channel-shaped circuit member secured to the frame, and a circuit board with circuitry on at least one side secured to the frame and so as to form with the channel-shaped member a four-sided structure containing circuitry on each of the elements forming the four walls of the structure. Electrical components such as resistors, capacitors, inductors, transistors, etc., either in discrete form or in integrated circuit form, are mounted in the interior of the four-sided structure and are electrically interconnected in accordance with circuit requirements, as well as being electrically connected in accordance with circuit requirements to the circuitry on the channel-shaped member and on the printed circuit board. A number of bus bars are provided for each electrical module. Two or more modules are arranged in a stack, when more than one module is required to construct an electrical system. Adjacent modules in the stack are electrically connected through their bus bars and through strip connectors. The electrical components are arranged in each module so as to afford efficient cooling, whether the modules are utilized individually or are stacked in a system.

Background of the invention

This invention relates to an electrical modular package and to a system constructed by assembling and electrically interconnecting such packages. While not limited thereto, the invention finds special application in the fabrication of large-scale wiring systems such, for example, as are found in computers.

In the mechanical design of computers, for example, the back-plane wiring is a constant source of aggravation and trouble in that myriads of wires criss-cross and terminate in great profusion and complexity. The present invention alleviates this condition by the use of circuit board structures and by effectively expanding the area of the back plane.

Summary of the invention

One of the objects of the present invention is to provide improvements in electrical structures.

Another object of the invention is to provide an improved electrical package of modular design.

A further object of the invention is to provide an electrical modular package which greatly simplifies the task of making electrical connections.

Still a further object of the invention is to provide improvements in electrical systems containing such modular packages.

Another object of the invention is to provide an electrical module and system which eliminate large numbers of conventional wires.

More specifically, it is a further object of the invention to provide an electrical module for computer systems which effectively expands the back-plane area for making connections.

A further object of the invention is to provide an electrical modular system with simplified means for electrically interconnecting the modules of the system.

Still a further object of the invention is to provide an electrical module and system with simplified and more efficient cooling means.

In accordance with the above objects and considered first in one of its broader aspects, an electrical module in accordance with the invention may comprise a frame, a channel or electrical insulating material secured to the frame and having a base wall and side walls extending from the base wall. A plurality of conductive contacts are bonded to the inside surface of the base wall, a plurality of elongate inside conductors are bonded to the inside surfaces of the side walls and a plurality of elongate outside conductors are bonded to the outside surfaces of each of the walls. Means is provided for electrically connecting the conductors on the outside surface of each side wall individually to the conductors on the inside surface of the same side wall, and means is provided for electrically connecting certain of the contacts individually to certain of the inside conductors. Further means is provided electrically connecting others of the contacts individually to certain of the outside conductors on the base wall. A plurality of elongate electrical unit assemblies are provided each comprising electrical components, a row of contact elements along one end of the assembly each electrically connected to one of the electrical components and a row of terminals at the opposite end of the assembly each electrically connected to one of the electrical components. Means is provided for positioning the electrical unit assemblies between the side walls of the channel so that each of the contact elements is in contact with one of the contacts.

In the system aspect of the invention, the electrical modules are mechanically interconnected and arranged in a stack. The stacked modules are electrically interconnected through bus bars carried by each of the modules and through a connecting means which electrically connects each of certain of the outside conductors of each module to an outside conductor of an adjacent module.

The invention will be more clearly understood when the detailed description of the preferred embodiment, which follows shortly, is read in conjunction with the accompanying drawings which are described below.

Description of the preferred emodiment

Figure 1:
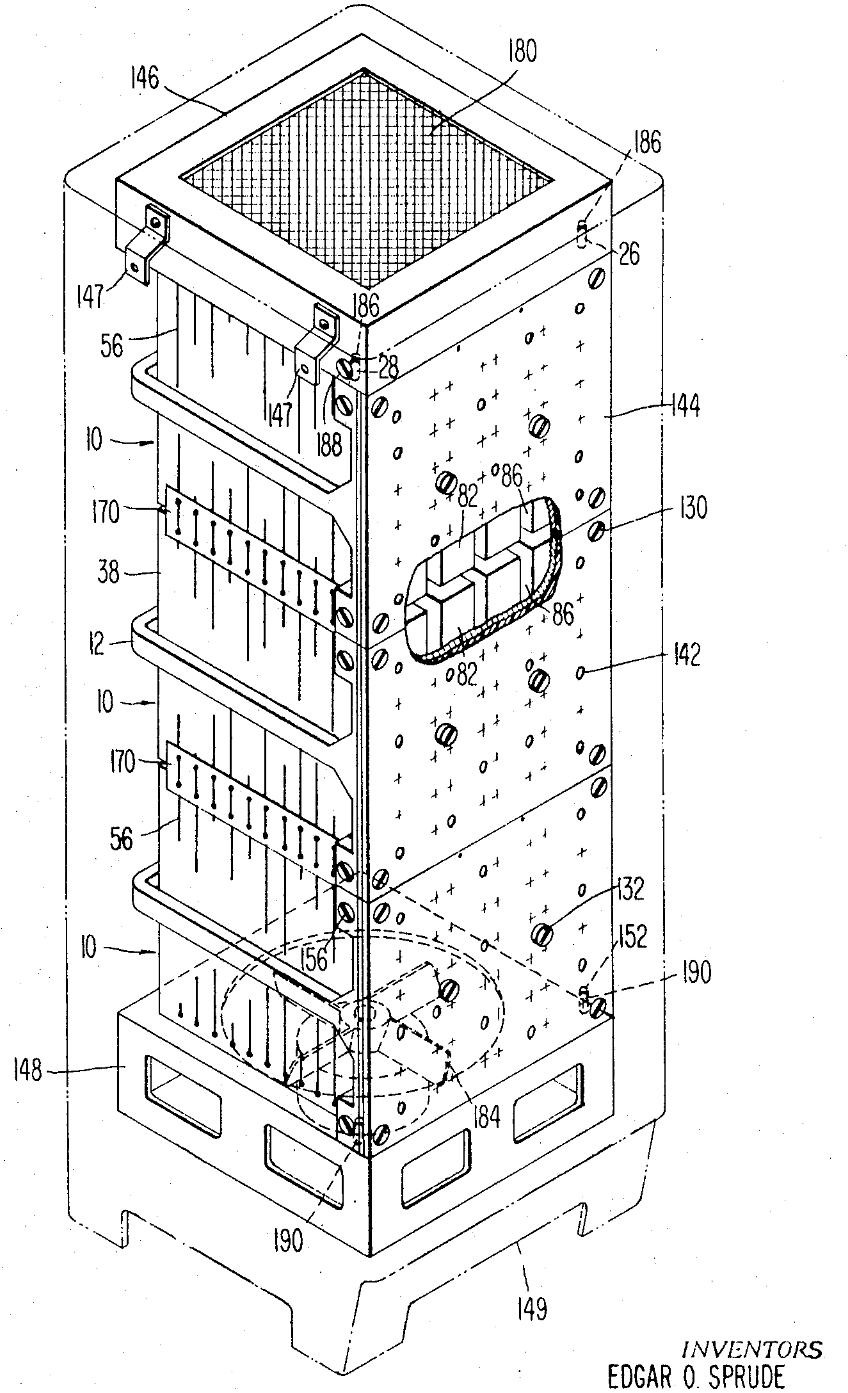
FIG. 1 is an isometric view of an electrical system constructed of electrical modules and in accordance with the invention.

Turning now to the details of the illustrated embodiment of the invention, the electrical module 10 (FIG. 2) comprises a module frame 12 provided with a rectangular frame member 14 (FIG. 5) at its front end. Extending rearwardly from the rectangular frame member 14 is a U-shaped horizontal brace 16 (see also FIG. 6) which has connected to its rear medial portion a vertical brace 18. Extending laterally from the vertical brace 18 are fingers 20, each of which has cemented or otherwise secured to its front face a strip of electrical insulating material 22. A tie pin 24 is press-fitted or otherwise secured in the upper end of the vertical brace 18. Similar tie pins 26 and 28 are similarly press-fitted or otherwise secured in the upper end of the rectangular frame member 14.

Figure 7:
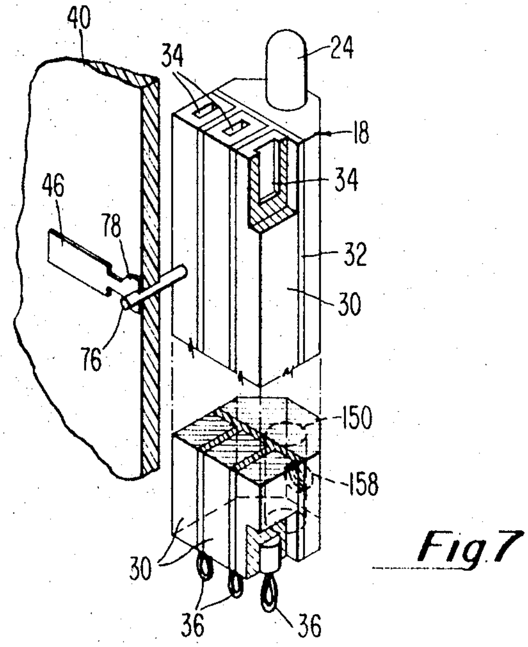
FIGS. 7 and 8 are fragmentary isometric views showing certain details.
Figure 8:
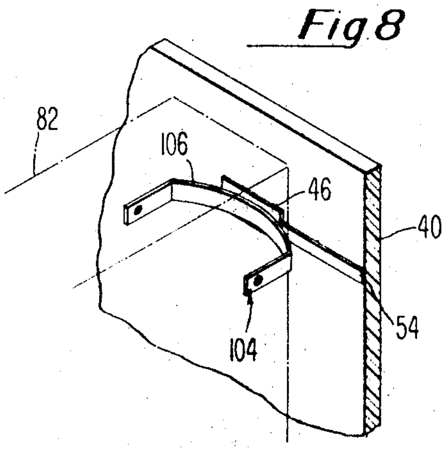

A plurality of bus bars 30 (FIG. 7) are provided for supplying voltages to the electrical module 10 from a suitable power supply, or other source, not shown. The number of bus bars 30 shown is merely illustrative, and may be more or less depending upon particular circuit requirements. Three bus bars 30 have been chosen for purposes of illustration and these may take various forms. In the illustrated embodiment of the invention, the bus bars 30 are preferably elongate and rectangular in cross section. They are electrically insulated from each other and from the vertical brace 18 by any suitable means which, in this embodiment, takes the form of a unitary structure of electrical insulating material 32, cemented or otherwise bonded to the bus bars 30 and to the vertical brace 18.

Each of the bus bars 30 is provided with a socket 34 in its upper end and with a banana-type plug 36 press-fitted or otherwise secured in its lower end.

A circuit board structure in the form of a U-shaped channel 38 (FIGS. 5 and 6) is disposed inside of the horizontal brace 16 between the bus bars 30 and insulators 22 and the rectangular frame member 14. The channel 38 consists of a formed sheet of electrical insulating material with electrical conductors and electrical contacts bonded to particular surfaces of the sheet, as will be explained. Preferably, the conductors and contacts on the surfaces of the channel 38 are obtained by well known printed circuit techniques. Other methods may be used. Thus, the channel 38 may be constructed in one way, for example, by applying the appropriate printed circuitry to both sides of a flat sheet of electrical insulating material, electrically connecting the circuitry on both sides of the sheet with the conductive plating on plated holes and then bending the printed circuit sheet into a U-shaped configuration, as shown.

The formed channel 38 comprises a base or rear wall 40 and side walls 42 and 44 extending forwardly from the rear wall 40. A plurality of flat conductive contacts 46 (FIG. 5) are bonded to the inside surface of the rear wall 40. A plurality of flat elongate, preferably parallel, conductors 48 are bonded to the inside surface of the wall 44 and a plurality of flat elongate, preferably parallel, conductors 50 (FIG. 6) are bonded to the inside surface of the side wall 42. Certain of the contacts 46, such as contacts 46*a* and 46*b*, for example, are electrically connected to one of the conductors 48 or 50, as by means of flat connecting conductors such as 52 and 54 (FIG. 5), bonded to the inside surface of the rear wall 40.

A group of flat elongate, preferably parallel, conductors 56 are bonded to the outside surface of the side wall 42 and two additional groups of flat elongate, preferably parallel, conductors 58 and 60 (FIG. 6) are bonded, respectively, to the outside surfaces of the side wall 44 and the rear wall 40. The conductors 56 on the outside surface of the side wall 42 are preferably perpendicular to the conductors 50 on the inside surface of the same side wall 42 and the conductors 58 on the outside surface of the side wall 44 are also preferably perpendicular to the inside conductors 48 on the inside surface of the same side wall 44. Each of the conductors 56, 58 and 60 is electrically connected to one of the conductors or contacts 50, 48 or 46, respectively, on the inside surface of the same side wall. In the present embodiment of the invention, these connections are preferably made by printed circuit techniques and take the form of conductive platings 62 (FIG. 12) on the surfaces of holes 63 which extend through the walls of the channel 38.

Figure 5:
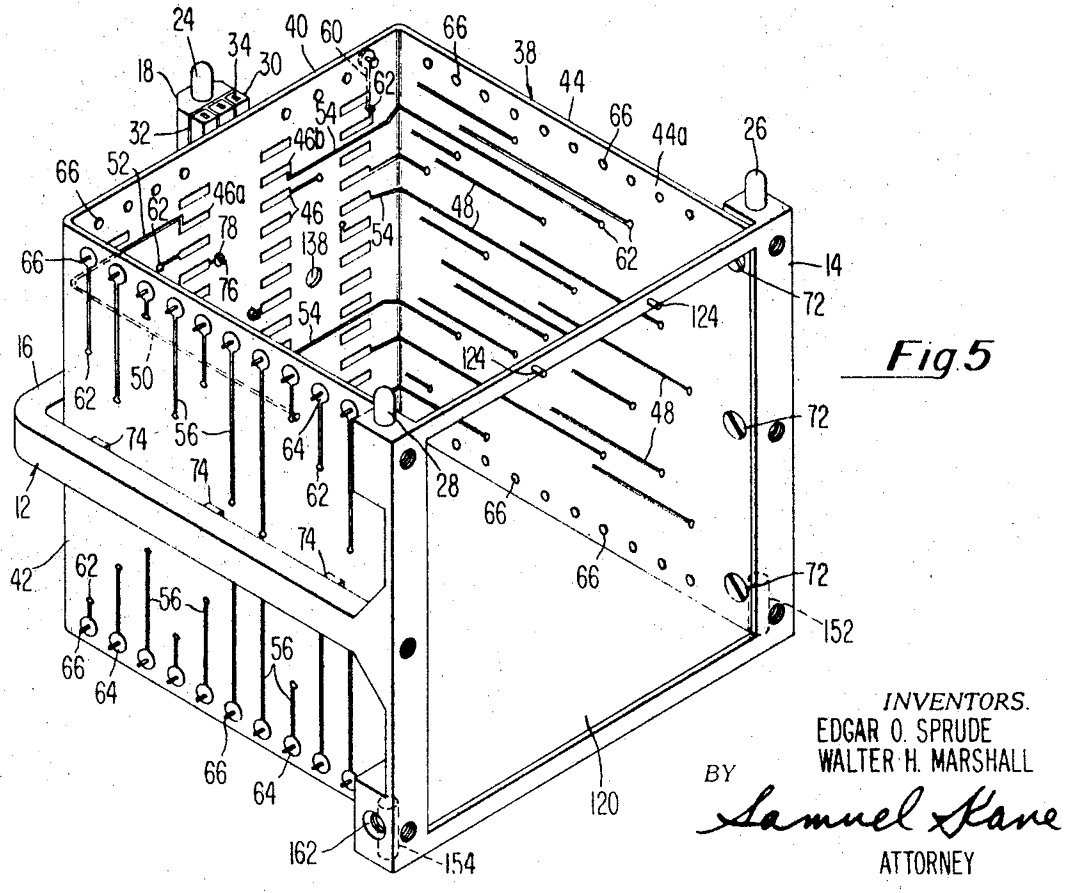
FIG. 5 is an isometric view, similar to FIG 2, but with the structure of FIG. 3 and certain other parts omitted.
Figure 6:
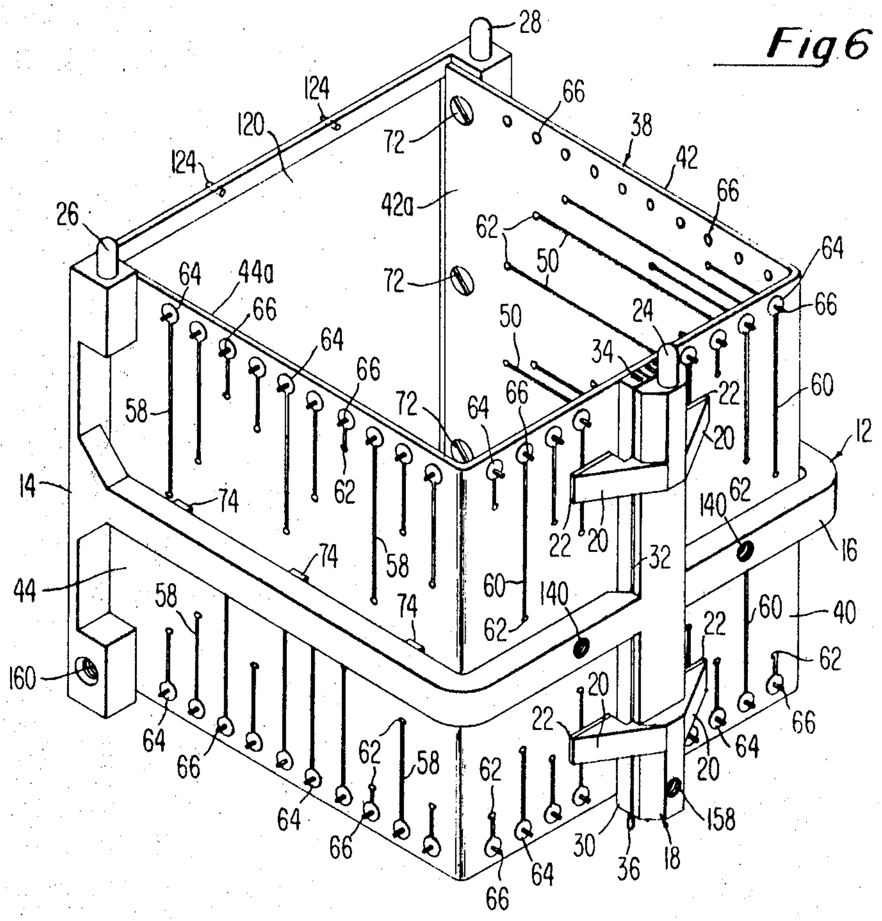
FIG. 6 is another isometric view of the structure shown in FIG. 5, but illustrated in the reverve position.

Accordingly, each of the conductors 56, 58 and 60 is connected at one end to the conductive plating 62 of one of the holes 63 and terminates at its other end in a conductive pad 64 (FIGS. 5 and 6). Headed conductive pins 66 (FIG. 12) are inserted through opening 68 in the rear and side walls 40, 42 and 44, and thence outwardly to project through the pads 64, in which position they are electrically connected to the pads 64, as by means of solder 70.

The channel 38 is secured to the modular frame 12 by having the forward marginal portions 42*a* and 44*a* (FIGS. 5 and 6) of the side walls 42 and 44 fastened to the rectangular frame member 14, as by means of screws 72. Additionally lateral supports for the channel 38 are provided by spacing lugs 74 which extend inwardly to the channel 38 from the horizontal brace 16.

In accordance with the particular circuit requirements, each of the bus bars 30 is provided with one or more conductive pins 76 (FIG. 7) each of which extends through an opening in the wall 40 and is electrically connected, as by soldering, to a conductive pad 78 which is electrically connected to the appropriate contact 46.

A subassembly 78 (FIG. 3) comprises a circuit board 80, a plurality of electrical unit assemblies 82 connected to the board 80 and a plurality of tie bolt units 84 for rigidly securing the electrical unit assemblies 82 in spaced relation. The spaces 86 between the unit assemblies 82 permit more efficient cooling of the electrical unit assemblies 82, as will appear more fully hereinafter.

Figure 4:
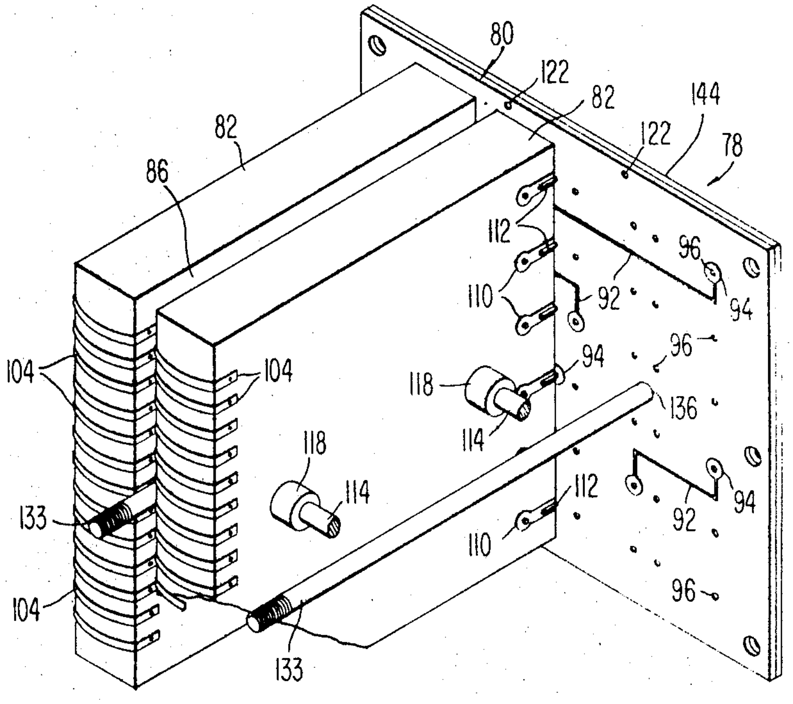
FIG. 4 is a fragmentary isometric view of a portion of the apparatus shown in FIG. 3.

The circuit board 80 may be provided with conductors on one or both of its major surfaces, in accordance with the particular circuit requirements, and these conductors may be applied to the board in various ways. Preferably, the conductors on the circuit board 80 are formed by well-known printed circuit techniques. A plurality of flat conductors 88 are bonded to the outside surface of the circuit board 80 each terminating at its ends in conductive pads 90. Certain of the pads 90, such as pads 90*a*, for example, are not connected to any conductor 88 but serve as additional mechanical connection points for certain terminals of the electrical unit assemblies 82. A plurality of flat conductors 92 are bonded to the inside surface of the circuit board 80 (FIG. 4) and each terminates at its ends in conductive pads 94. The circuit board 80 is perforated with holes 96, certain of which pass through the medial portion of a pad 94 and one of the pads 90 or 90*a* (FIG. 3), and others of which pass only through a pad 90 or 90*a*.

Each electrical unit assembly 82 includes an electrical insulating encapsulating material 98 (FIG. 10) which encases a plurality of electrical components 100. The electrical components 100 may take various forms, depending upon the particular circuit requirements, and may include such components as resistors, capacitors, inductors, transistors, etc., which may be either in discrete or integrated circuit form. It may be noted at this time that because of the large number of connections which the present invention affords, the invention is particularly suitable for packaging integrated circuit components.

The electrical components 100 are electrically interconnected in each unit assembly 82 in accordance with the particular circuit requirements. Certain of the electrical components 100 have one of their leads, such as leads 102, for example, projecting outwardly from the unit assembly 82 and electrically connected, as by soldering, to one end of a contact element 104 which wraps around and has a bowed portion 106 across the rear face of the electrical unit assembly 82. Certain of the electrical components 100 have one of their leads, such as leads 108, for example, projecting outwardly through the electrical unit assembly 82 and electrically connected, as by soldering, to a conductor 110 bonded to one or the other of the major side surfaces of the electrical unit assembly 82. Pin terminals 112 project through and beyond the circuit board 80 and are electrically connected, as by soldering, to the conductors 110 and to the particular pads 90, 90a and 94, as the case may be.

Each tie bolt assembly 84 (FIG. 3) ties together the electrical unit assemblies 82 and includes a shouldered screw 114 which passes through a suitable hole in each of the electrical unit assemblies 82, a nut 116 which is threaded up to the shoulder of the screw 114 so as to draw in and position the endmost electrical unit assemblies 82, and a plurality of spacers 118 mounted on the body of the screw 114, each spacer 118 positioned between adjacent electrical unit assemblies 82.

Figures 2, 3:
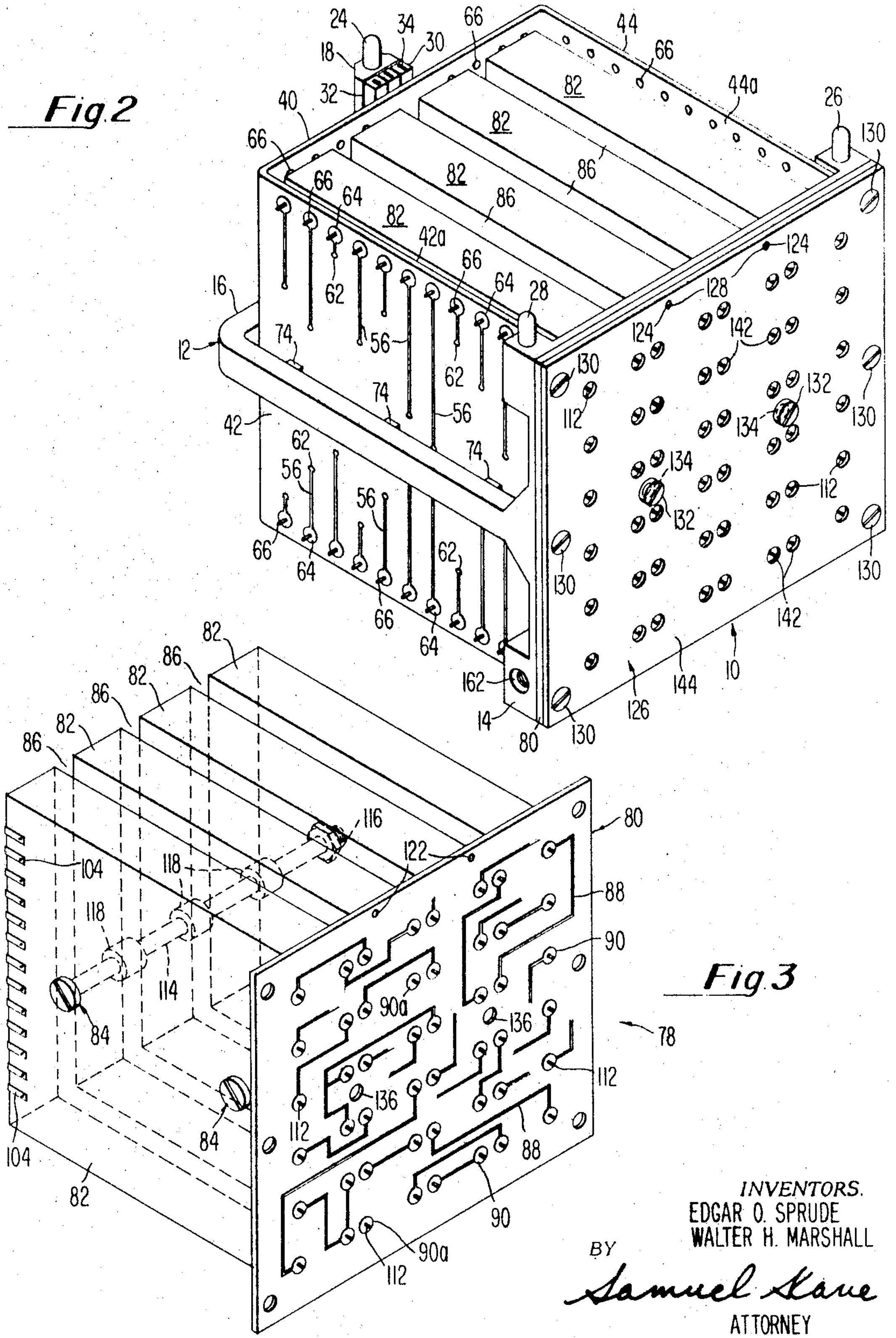
FIG. 2 is an isometric view of one of the electrical modules of FIG. 1, constructed in accordance with the invention.
FIG. 3 is an isometric view, similar to FIG. 2, but with certain parts omitted and with certain other hidden parts shown.

The subassembly of FIG. 3 is assembled to the structure shown in FIG. 5 by inserting it rearwardly into the FIG. 5 structure so that the electrical unit assemblies 82 pass through the rectangular opening 120 in the rectangular frame member 14 until the circuit board 80 is aligned by having its guide holes 122 (FIG. 3) receive guide pins 124 (FIG. 5) secured to the rectangular frame member 14. A face plate 126 (FIG. 2), similarly provided with guide holes 128, is applied over the circuit board 80 so that ends of the guide pins 124 which project through the guide slots 122 will be received into the guide holes 128. Screws 130 fasten the face plate 126 and the subassembly 78 to the module frame 12.

To provide additional draw-in, if necessary, for the subassembly 78 at its medial portion, headed draw rods 132 are provided. Each draw rod 132 has an elongate body portion 133 (FIG. 4) which passes through a hole 134 (FIG. 2) in the face plate 126, thence through a hole 136 (FIGS. 3 and 4) in the circuit board 80, thence through one of the spaces 86, thence through a hole 138 (FIG. 5) in the rear wall 40 of the channel 38 to have its end portion threaded into a tapped hole 140 (FIG. 6) of the horizontal brace 16.

Upon tightening of the screws 130, the electrical unit assemblies 82 will be forced inwardly into the channel 38 to an extent so that the bowed portions 106 of the contact elements 104 will press against their associated contacts 46 on the rear wall 40. By suitably adjusting the draw rods 132, the contact force of the bowed portions 106 against the contacts 46 can be varied. The face plate 126, the circuit board 80, and the horizontal brace 16 are sufficiently elastic to permit ample movement of the draw rods 132 for this purpose.

The face plate 126 is provided with a series of access holes 142 (FIGS. 2 and 10) each in line with the projecting end of one of the pin terminals 112. The ends of the pin terminals 112 are positioned below the outer surface 144 of the face plate 126 so that while they are available essentially on the outside of the module 10 for applying the prods of testing instruments and the like, they are nevertheless protected against accidental contact and injury from external agencies.

When there are more than one electrical module 10 in an electrical system, the electrical modules 10 are arranged in a stack and mechanically and electrically interconnected. Each stack may contain two or more electrical modules 10 depending upon the particular system requirements. More stacks may be added, if needed. The electrical assembly in FIG. 1 shows, by way of example, three of the electrical modules 10 in a stack, together with upper and lower frame structures 146 and 148, and an outer skin cabinet structure 149 which may be secured to one or both of the frame structures 146 and 148, as by means of brackets 147. Each electrical module 10 is provided with a tie pin hole 150 in the lower end of its vertical brace 18 (FIGS. 7 and 9), and with tie pin holes 152 and 154 in the lower corners of the rectangular frame member 14 (FIGS. 5 and 11).

When adjacent electrical modules 10 are stacked together, the bus bar plugs 36 of the upper module 10 plug into and resiliently contact the walls of the bus bar sockets 34 of the lower adjacent module 10, and the tie pin holes 150, 152 and 154 of the upper module 10 receive the corresponding tie pins 24, 26 and 28 of the lower adjacent module 10. Screws 156 (FIGS. 1, 9 and 11) are threaded into tapped holes 158, 160 and 162 (FIGS. 5–7) and tightened so that they grip the tie pins 24, 26 and 28, of the lower adjacent module 10.

Figures 9, 10, 11, 12:
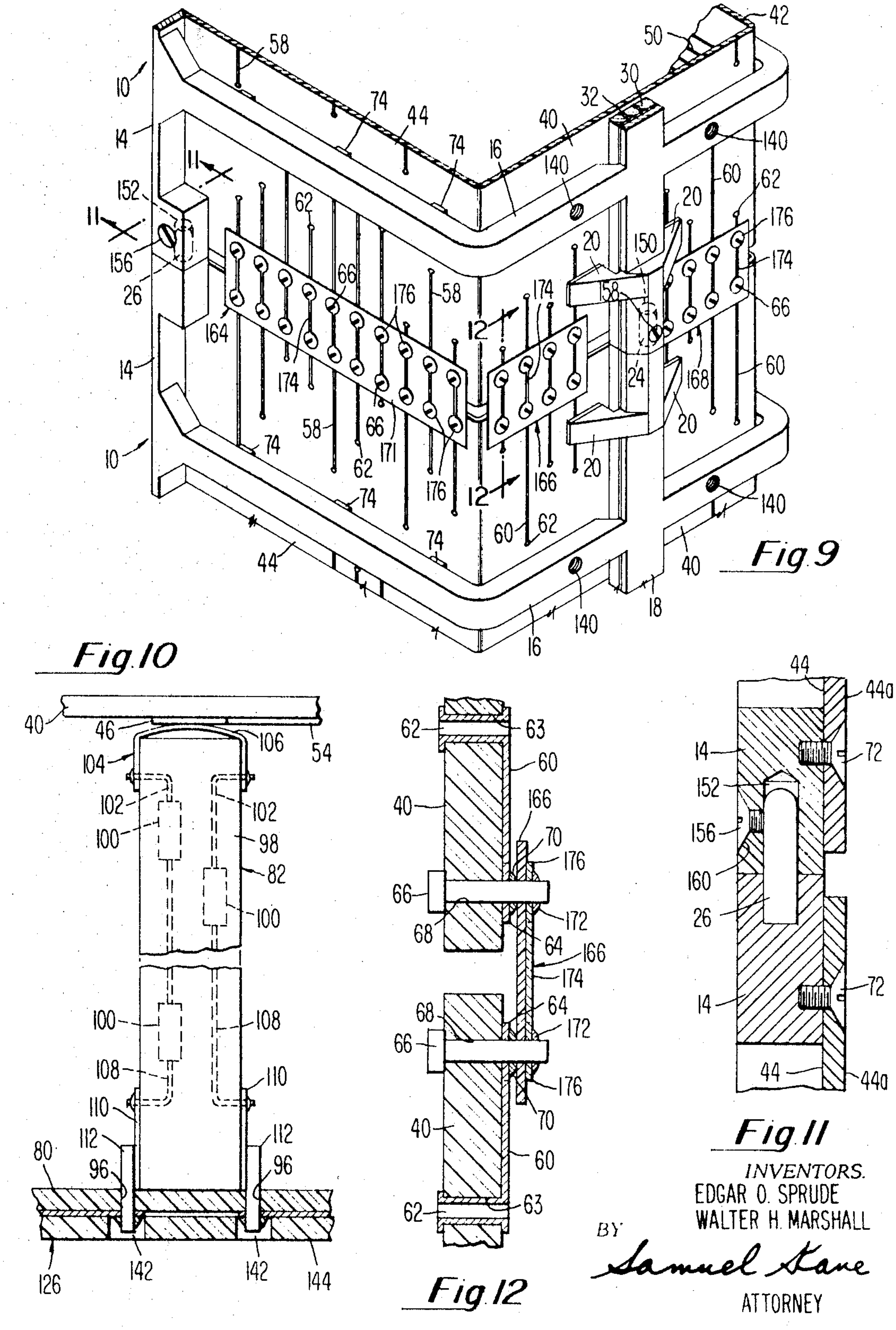
FIG. 9 is an isometric view of fragmentary portions of adjacent stacked modules of FIG. 1, illustrating the manner of electrically interconnecting certain of their conductors.
FIG. 10 is a fragmentary sectional view illustrating certain details of one of the block-like electrical unit assemblies shown in FIGS. 2–4.
FIG. 11 is a fragmentary sectional view along line 11–11 of FIG. 9.
FIG. 12 is a fragmentary sectional view taken along line 12–12 of FIG. 9.

The outside conductors 56, 58 and 60 on the outside surfaces of adjacent upper and lower channels 38 are electrically connected by means of strip connectors 164, 166, 168 and 170 (FIGS. 1 and 9). These connectors are similarly constructed, therefore, a description of only one of them will be given.

The strip connector 164, for example (FIG. 9), comprises an elongate strip of electrical insulating material 171 to which is bonded a plurality of flat elongate, preferably parallel, conductors 174, preferably of the printed circuit type, which terminate at their ends in conductive pads 176. The strip connector 164 is perforated through the pads 176 so as to receive the shanks of associated headed pins 66. Thus, the strip connector 164 is applied over the adjacent rows of headed pins 66 of the upper and lower electrical modules 10 and then each pad 176 is electrically connected to its associated pin 66. A detail of this type of connection is given in FIG. 12 which includes a sectional view of one of the other strip connectors 166. As shown in FIG. 12, the pads 176 at the ends of the individual conductors 174 are electrically connected to their associated pins 66, as by means of solder 172.

Preferably, the strip connectors 164, 166, 168 and 170 are flexible so that, if necessary, they can readily bulge at their medial portions, where the adjacent upper and lower modules 10 face each other, when they are placed over the pins 66. Assembly is thereby facilitated and tolerances need not be so critical.

The stack of electrical modules 10 may be provided with upper and lower frame structures 146 and 148 (FIG. 1), mentioned previously. Thus, the upper frame structure 146 is provided with an open grating 180 to pass a flow of coolant, and with tie pin openings 186 and clamping screws 188 to receive and fasten to the tie pins 24, 26 and 28 of the uppermost electrical module 10. The lower frame structure 148 is provided with three similar tie pins 190, and has an open construction to facilitate the flow of coolant. Clamping screws 156 threaded into the tapped holes 158, 160 and 162 of the lowermost electrical module 10 are tightened against the tie pins 190 of the lower frame structure 148.

In the stack of modules 10, the aligned spaces 86 of the adjacent modules in the stack provide a series of paths in the interior of the stack for the passage of coolant, so that the heat generated by the electrical components 100 in the electrical unit assemblies 82 can be dissipated more efficiently. For this purpose, a source of coolant may be located in the interior of the lower frame structure 148. Preferably, the coolant source takes the form of a blower or fan 184 which, when operating, forces air to flow through the above-mentioned aligned spaces and through the grating 180.

The upper rows of pins 66 in the uppermost module 10 in the stack and the lower rows of pins 66 in the lowermost module 10 in the stack provide input and output connection means for connecting the stack to associated apparatus such as, for example, a computer.

In the previous description of the channel 38, an exemplary method of constructing the channel was given, in which a sheet of electrical insulating material with printed circuitry thereon was bent into a U-shaped configuration. That method utilizes a sheet of electrical insulating material which is formable.

An alternate method of constructing the formed channel 38 utilizes a sheet of B-stage glass epoxy, known in the art as "Pre-Preg." In this method, the epoxy sheet is first clad on both sides with conductive material, such as copper, for example. The copper-clad epoxy sheet is then placed into a suitable male-female forming die and subjected to an appropriate amount of heat and pressure therein to give it a channel-shaped form. The heat serves to cure the epoxy as well as to facilitate the forming or bending operation. Printed circuit techniques are next applied to form the copper cladding into circuitry on all sides of the formed channel, and to appropriately connect this circuitry with the conductive plating on plated holes drilled or otherwise formed in the channel.

While there has been shown and described a specific electrical module and a specific electrical assembly to exemplify the principles of the invention, it is to be understood that there are preferred forms of the invention and that the invention is capable of being constructed in a variety of shapes, sizes and modifications without departing from its true spirit and scope. Accordingly, the invention is not limited by the specific module and system disclosed, but only by the subjoined claims.

We claim:

1. An electrical module comprising a frame, a channel of electrical insulating material secured to said frame and having a base wall and side walls extending from said base wall, a plurality of conductive contacts bonded to the inside surface of said base wall, a plurality of elongate inside conductors bonded to the inside surfaces of said side walls, a plurality of elongate outside conductors bonded to the outside surfaces of each of said walls, means electrically connecting the conductors on the outside surface of each side wall individually to the conductors on the inside surface of the same side wall, means electrically connecting certain of said contacts individually to certain of said inside conductors, means electrically connecting others of said contacts individually to certain of the outside conductors on said base wall, a plurality of elongate electrical unit assemblies each comprising electrical components, a row of contact elements along one end of the assembly each electrically connected to one of said electrical components, and a row of terminals at the opposite end of the assembly each electrically connected to one of said electrical components, and means positioning said electrical unit assemblies between said side walls so that each of said contact elements is in contact with one of said contacts.

2. An electrical module comprising a frame provided with an opening, a substantially U-shaped channel of electrical insulating material secured to said frame and having a base wall and side walls extending from said base wall, a plurality of conductive contacts bonded to the inside surface of said base wall, a plurality of elongate substantially parallel inside conductors bonded to the inside surfaces of said side walls, a plurality of elongate substantially parallel outside conductors bonded to the outside surfaces of each of said walls, the conductors on the outside surface of each side wall being substantially perpendicular to the conductors on the inside surface of the same side wall, means electrically connecting the conductors on the outside surface of each side wall individually to the conductors on the inside surface of the same side wall, means electrically connecting certain of said contacts individually to certain of said inside conductors, means electrically connecting others of said contacts individually to certain of the outside conductors on said base wall, and a plurality of electrical unit assemblies inserted through said opening and held in position in the channel between said side walls, each unit assembly comprising electrical components, a row of contact elements along one end of the assembly each electrically connected to one of said electrical components and in contact with one of said contacts, and a row of elongate terminals at the opposite end of the assembly each electrically connected to one of said electrical components.

3. An electrical module comprising a frame provided with an opening, a substantially U-shaped channel of electrical insulating material having a rear wall and side walls extending from said rear wall and with marginal portions of said side walls positioned adjacent to said opening, a plurality of flat conductive contacts bonded to the inside surface of said rear wall, a plurality of elongate substantially parallel flat inside conductors bonded to the inside surfaces of said side walls, a plurality of elongate substantialy parallel flat outside conductors bonded to the outside surfaces of each of said walls, the conductors on the outside surface of each side wall being substantially perpendicular to the conductors on the inside surface of the same side wall, means electrically connecting the conductors on the outside surface of each side wall individually to the conductors on the inside surface of the same side wall, means electrically connecting certain of said contacts individually to certain of said inside conductors, means electrically connecting others of said contacts individually to certain of the outside conductors on said rear wall, a plurality of conductive bus bars each electrically connected to one of said contacts, and a plurality of block-like electrical unit assemblies inserted rearwardly through said opening and held in position in the channel between said side walls, each unit assembly comprising electrical components, a row of contact elements along the rear face of the assembly each electrically connected to one of said electrical components and in contact with one of said contacts, and a row of elongate terminals at the front face of the assembly each electrically connected to one of said electrical components.

4. An electrical module comprising a frame having a substantially rectangular opening, a substantially U-shaped channel of electrical insulating material secured to said frame and having a rear wall and side walls extending from said rear wall and with marginal portions of said side walls positioned adjacent to said substantially rectangular opening, a plurality of flat conductive contacts bonded to the inside surface of said rear wall, a plurality of elongate substantially parallel flat inside conductors bonded to the inside surfaces of said side walls, a plurality of elongate substantially parallel flat outside conductors bonded to the outside surfaces of each of said walls, the conductors on the outside surface of each side wall being substantially perpendicular to the conductors on the inside surface of the same side wall, means electrically connecting the conductors on the outside surface of each side wall individually to the conductors on the inside surface of that same side wall, means electrically connecting certain of said contacts individually to certain of said inside conductors, means electrically connecting others of said contacts individually to certain of the outside conductors on said rear wall, a plurality of conductive bus bars mounted externally relative to said channel and each provided with a conductive member projecting through an opening in said channel and electrically connected to one of said contacts, and a plurality of spaced block-like electrical unit assemblies inserted rearwardly through said substantially rectangular opening and held in position in the channel between said side walls, each unit assembly comprising electrical components, a row of contact elements along the rear face of the assembly each electrically connected to one of said electrical components and in contact with one of said contacts, and a row of elongate terminals at the front face of the assembly each electrically connected to one of said electrical components.

5. An electrical module according to claim 4 and including a circuit board of electrical insulating material secured to said frame so as to cover said substantially rectangular opening and provided with flat circuit board conductors bonded to at least one of its major surfaces and provided further with openings each adjacent to one of said circuit board conductors, each of said terminals having a portion extending into one of said circuit board openings and electrically connected to the adjacent circuit board conductor.

6. An electrical module according to claim 5 characterized further in that said contact elements are resilient, in that each of said terminal portions projects outwardly through its circuit board opening, and in that there are provided a face plate substantially covering said circuit board and having openings in line with said circuit board openings, and means securing the face plate and circuit board to said frame and urging said electrical unit assemblies inwardly into said channel to an extent so that said contact elements press against said contacts, and wherein each of said outwardly projecting terminal portions projects into and is accessible through the associated face plate opening and is below the outside surface of said face plate.

7. An electrical system comprising a plurality of electrical modules according to claim 5, interconnected and arranged in a stack, means electrically interconnecting corresponding bus bars of adjacent modules, and connecting means electrically connecting certain of the outside conductors of each module individually to outside conductors of an adjacent module.

8. An electrical system according to claim 7 wherein said connecting means comprises a pluralit yof strips of electrical insulating material, each strip bridging corresponding outside surfaces of adjacent modules and containing a plurality of strip conductors, each strip conductor electrically connecting an outside conductor of one module to an outside conductor of an adjacent module.

9. An electrical system according to claim 8 wherein the spaces between said electrical unit assemblies of one module are in line with the spaces between the electrical unit assemblies of an adjacent module, and wherein means is included for providing a flow of coolant through said aligned spaces.

10. An electrical system according to claim 8 wherein said strips are flexible.

References Cited

UNITED STATES PATENTS 3,328,646 6/1967 Caillat.

LEWIS H. MYERS, Primary Examiner

G. P. TOLIN, Assistant Examiner

U.S. Cl. X.R.

317—100, 101